June 24, 1958    H. E. VAN VALKENBURG ET AL    2,839,916
ULTRASONIC THICKNESS GAUGE
Filed Aug. 19, 1954

United States Patent Office 2,839,916
Patented June 24, 1958

2,839,916

ULTRASONIC THICKNESS GAUGE

Howard E. Van Valkenburg, Candlewood Isle, and Edward G. Cook, Brookfield, Conn., assignors to Sperry Products, Inc., Danbury, Conn., a corporation of New York Application August 19, 1954, Serial No. 450,846

2 Claims. (Cl. 73—67.8)

This invention relates to devices such as disclosed in the patent to Rassweiler and Erwin No. 2,431,234 granted November 18, 1947, which have as their object to indicate the resonant frequency as a measure of the thickness of the work piece. The theory underlying these devices is that at resonant frequency there is a change in the effective electrical impedance of the composite acoustic system comprising the piezo-electric element, the couplant and the work piece. For this purpose a variable frequency oscillator drives a crystal search unit which transmits acoustic waves through a couplant into the work piece. The sweep of a cathode ray tube is synchronized with the energization of the oscillator so that the length of sweep corresponds to the range of frequencies and, hence, to the range of thicknesses of work piece. The occurrence of resonance is accompanied by a surge of current through the oscillator and can be detected and displayed as a large vertical deflection of the sweep. The position of such large vertical deflection on the sweep is a function of the thickness of the work piece, and various methods have been employed for calibrating the face of the cathode ray tube directly in terms of thickness. The method most frequently employed consists in transmitting the range of oscillations into a standard block of known thickness. This gives a calibration on the sweep corresponding to one known frequency and, therefore, one known thickness. Additional calibrations may be obtained by utilizing additional standard test pieces of known thicknesses. These calibrations have proved to be neither accurate nor stable, principally for the reason that the capacitance of the electrical system (tubes, cables, couplant between transducer and work piece) varies during operation. Thus, a test piece of known thickness will yield a calibration mark along the sweep which varies in position under variations in operating conditions, or, stated differently, if a calibration mark is fixed upon the cathode ray screen, there is no assurance that the thickness of work pieces tested thereafter will be correctly indicated.

It is therefore the principal object of this invention to provide calibration marks on a cathode ray tube, which marks will be stable and accurate under operating conditions which may vary the capacitance of the ultrasonic testing circuit.

Further objects and advantages of this invention will become apparent in the following detailed description thereof.

Figure 1:
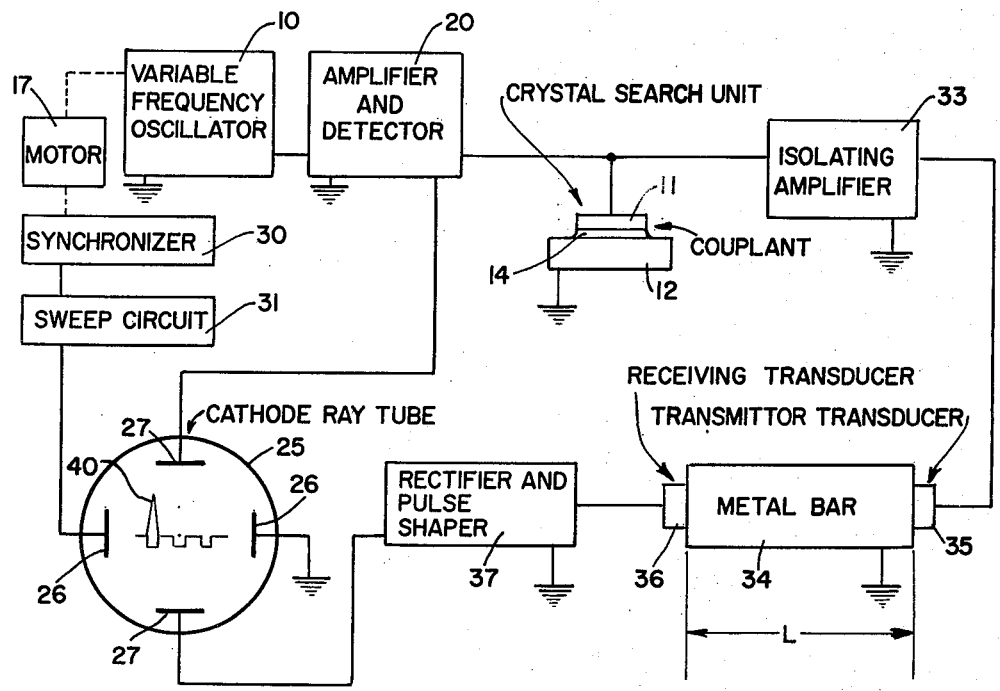

In the accompanying drawings,

Fig. 1 is a wiring diagram of an ultrasonic testing circuit embodying our invention.

Figure 2A:
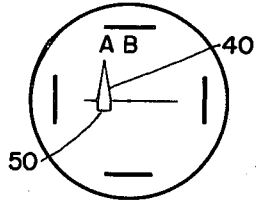

Figs. 2A, B and C are a series of graphs of a cathode ray tube screen showing the theory of this invention.

Referring to Fig. 1, there is disclosed an oscillator 10 for energizing a piezo-electric element which may be in the form of a quartz crystal 11 which transforms the electrical oscillations into mechanical oscillations and transmits the mechanical oscillations to work piece 12 through a suitable couplant 14. The oscillator may be any known type employing a variable capacitor whereby the frequency may be continuously varied through a predetermined range by means of a motor 17 driving the capacitor. When a frequency is reached such that a resonant condition exists, maximum current will suddenly be drawn from the oscillatory circuit, and this rapid change in current flow after being suitably amplified by a signal amplifier 20 may be indicated on any appropriate instrument, such as a cathode ray tube 25 having a sweep between horizontal plates 26, the signal being applied to vertical plates 27. The motor 17 drives a synchronizing mechanism 30 to energize the sweep circuit 31 in synchronization with the generation of oscillations through the range of frequencies. When resonance is established, a sharp indication 40 will appear on the screen, and the position of this indication along the sweep is a function of the frequency and, therefore, of the thickness of the work piece.

Figure 2B:
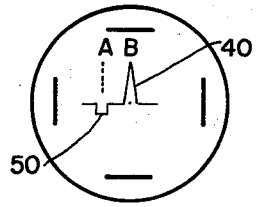

In order that thickness may be read directly on the cathode ray tube screen it has been the practice, as stated in the introduction hereto, to provide marks obtained by substituting standard pieces of known thickness in place of the work piece 12. Thus, referring to Fig. 2A, a calibration mark 50 is obtained in position A indicating a predetermined thickness. If a work piece of the same thickness as the standard piece is tested, it should yield an indication 40 in position A coincident with calibration mark 50. However, as stated hereinbefore, various factors such as temperature, changing tube characteristics and variations in couplant, all combine to vary the capacitance of the electrical system from oscillator to work piece with the result that even though the work piece is of the same thickness as the test piece which yielded the calibration mark 50, the resonant indication will appear not at position A but at position B as shown in Fig. 2B. This condition apparently indicates that the work piece is of different thickness from the test piece which yielded calibration mark 50, whereas actually the work piece has the same thickness as the test piece. Errors in reading thickness are thus introduced.

Figure 2C:
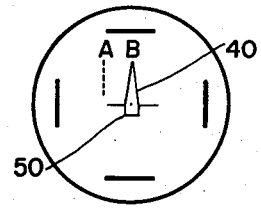

To obviate the above-described condition, there is provided means whereby the calibration marks, such as mark 50, instead of being fixed relative to the sweep, will vary their positions in response to the variations in capacity of the electrical system so that these marks will be affected in the same manner and to the same degree as the indications of resonance in the work piece. For this purpose a portion of the electrical signal which drives the crystal 11 is fed into an isolating amplifier 33 whose output is caused to pass through a calibrated length of bar 34 by means of transmitting transducer 35 and receiving transducer 36. The bar will resonate each time the frequency of the acoustic wave is such that the length of the bar is equal to an integral number of half wave lengths. Thus if the length of the bar is 5.75 inches long, it will be equal to a half wave length for a frequency of 20 kc., and fifty resonances would occur as the frequency varied from 1 to 2 mc. These points of resonance would occur for each increment of 20 kc. The output of the receiving transducer 36 is fed into a rectifier and pulse shaper 37 which converts the fifty resonance signals into fifty "marker type" signals which are applied to the vertical plates of the oscilloscope and would appear as fifty calibration marks. It is thus apparent that the calibration piece 34 is subject to the same variations in capacity in the electrical system as the work piece, and the calibration marks will vary their positions along the sweep in response to such variations. Thus, variation in capacity which would cause the indication 40 of resonance in the work piece to move from position A to position B, will also cause the marker 50 to move to position B as shown in Fig. 2C, and no error in determining the thickness of the work piece relative to the thickness of the calibration piece will arise.

Having described our invention, what we claim and desire to secure by Letters Patent is:

1. Measuring means for a work piece, comprising an electrical system including a variable frequency electric oscillator, a first piezo-electric transducer engaging the work piece and energized by the oscillator for transforming electrical oscillations into mechanical oscillations, means for cyclically varying the frequency of the electrical oscillations through a predetermined range to establish resonance in the work piece, the frequency output from the electrical system including said first transducer being subject to variation as the capacitance of the electric system varies, and means for calibrating the resonance frequencies independent of said capacitance variations, said last-named means comprising a calibration test piece, a second piezo-electric transducer engaging one surface of the calibration piece for transmitting acoustic oscillations therethrough, a third piezo-electric transducer engaging an opposite surface of the calibration piece for receiving the acoustic oscillations passing therethrough, means for applying a portion of the oscillator output to said second transducer whereby the second transducer is subject to the said variations in frequency output of the electric system, means for electrically isolating the calibration means from the work piece measuring means, and a single indicating means for indicating the resonance points of the calibration piece and the work piece through said predetermined range.

2. Measuring means for a work piece as specified in claim 1, in which the indicating means is an oscilloscope having horizontal and vertical sets of plates, a sweep circuit for generating a sweep between one set of plates, means for synchronizing the sweep circuit and the means for cyclically varying the frequency of the electrical oscillations through the predetermined range, and means whereby the outputs from said first and third piezo-electric transducers are applied to said other set of oscilloscope plates.

References Cited in the file of this patent

UNITED STATES PATENTS

| | | |
|---|---|---|
| 2,514,482 | Farmer | July 11, 1950 |
| 2,612,772 | McConnell | Oct. 7, 1952 |
| 2,667,063 | Cunningham | Jan. 26, 1954 |